(12) United States Patent
Walker et al.

(10) Patent No.: US 11,848,797 B2
(45) Date of Patent: Dec. 19, 2023

(54) COMMUNICATION CONTROL DEVICE FOR A USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Steffen Walker, Reutlingen (DE); Arthur Mutter, Neuhausen (DE); Simon Weissenmayer, Flein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 94 days.

(21) Appl. No.: 17/457,887

(22) Filed: Dec. 6, 2021

(65) Prior Publication Data

US 2022/0217010 A1    Jul. 7, 2022

(30) Foreign Application Priority Data

Jan. 7, 2021    (DE) .................... 10 2021 200 082.7

(51) Int. Cl.
*H04L 12/40*    (2006.01)

(52) U.S. Cl.
CPC .... *H04L 12/40* (2013.01); *H04L 2012/40215* (2013.01)

(58) Field of Classification Search
CPC . H04L 12/40; H04L 12/725; H04L 12/40032; H04L 12/40143; H04L 45/30; H04L 1/0083; H04L 12/407; H04L 12/40013; H04L 12/40019; H04L 12/40084; H04L 12/40097; H04L 12/40039; H04L 12/413; H04L 12/4135; G06F 13/4282; G06F 13/42; G06F 13/4027; G06F 13/4221; G06F 13/374; H04W 12/02; H04W 12/10
USPC ........................................................ 370/257
See application file for complete search history.

(56) References Cited

U.S. PATENT DOCUMENTS

| | | | |
|---|---|---|---|
| 9,965,426 B2 * | 5/2018 | Pihet .................. | G05F 1/625 |
| 10,700,886 B2 * | 6/2020 | Hell .................. | H04L 12/4135 |
| 11,245,547 B2 * | 2/2022 | Antonsson .......... | H04L 12/4625 |
| 11,368,330 B2 * | 6/2022 | de Haas ............ | H04L 12/40169 |
| 11,374,758 B2 * | 6/2022 | Zeh .................. | H04L 63/126 |
| 11,584,314 B2 * | 2/2023 | de Haas ............. | B60R 16/023 |
| 11,588,663 B1 * | 2/2023 | Muth ................ | H04L 12/40039 |
| 11,601,221 B2 * | 3/2023 | Mutter .............. | H04L 12/407 |

(Continued)

*Primary Examiner* — Man U Phan
(74) *Attorney, Agent, or Firm* — NORTON ROSE FULBRIGHT US LLP; Gerard Messina

(57) ABSTRACT

A communication control device for a user station for a serial bus system and a method for communicating in a serial bus system. The communication control device controls a communication of the user station with at least one other user station of the bus system, and to generate a transmission signal for transmission onto a bus of the bus system and/or to receive a signal from the bus. The communication control device is designed to generate the transmission signal according to a frame. The communication control device is designed to generate the transmission signal in such a way that in the transmission signal, the bit time of at least one bit is adapted as a function of an edge height that is to be provided between the at least one bit and the preceding bit in a signal in which the bit is to be transferred via the bus.

14 Claims, 6 Drawing Sheets

(56) References Cited

U.S. PATENT DOCUMENTS

2020/0313937 A1* 10/2020 Glenn ............... H04L 12/40013
2022/0239527 A1* 7/2022 Hartwich ................ H04L 12/40

* cited by examiner

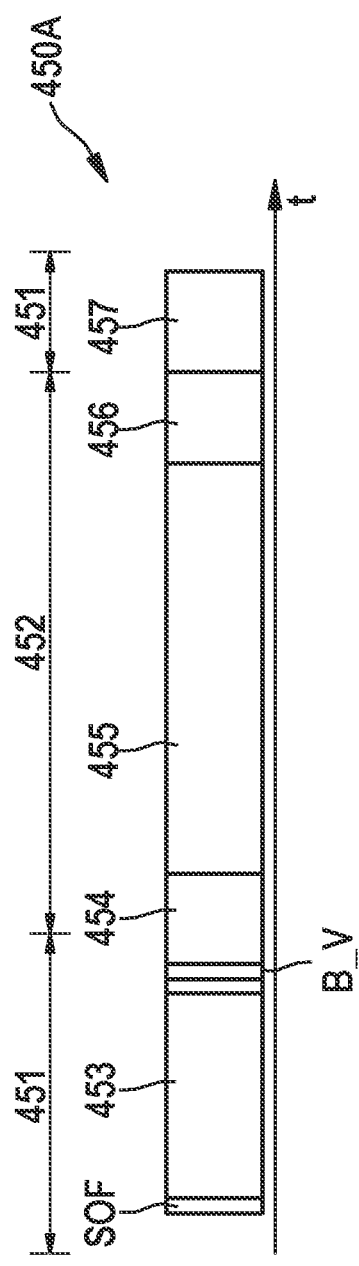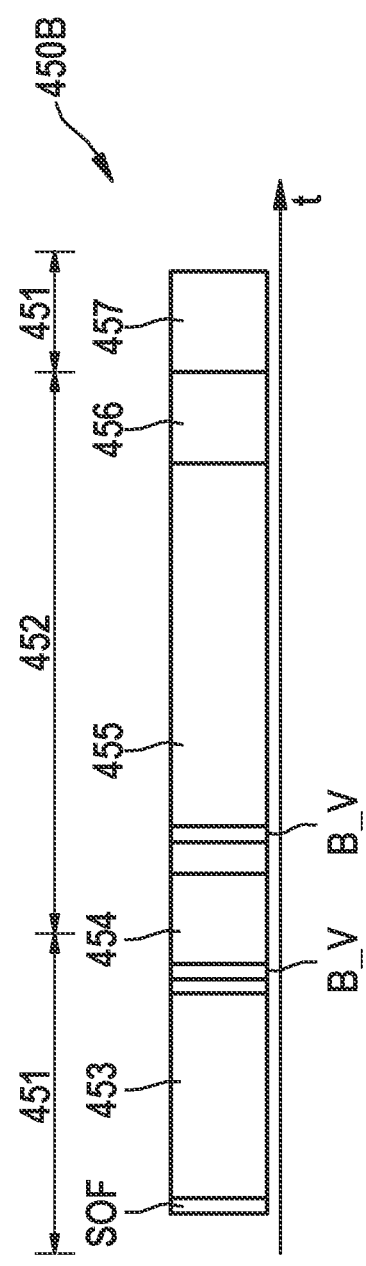

COMMUNICATION CONTROL DEVICE FOR A USER STATION FOR A SERIAL BUS SYSTEM, AND METHOD FOR COMMUNICATING IN A SERIAL BUS SYSTEM

CROSS REFERENCE

The present application claims the benefit under 35 U.S.C. § 119 of German Patent Application No. DE 102021200082.7 filed on Jan. 7, 2021, which is expressly incorporated herein by reference in its entirety.

FIELD

The present invention relates to a communication control device for a user station for a serial bus system, and a method for communicating in a serial bus system that operates at a high data rate and a high level of error robustness.

BACKGROUND INFORMATION

Bus systems for the communication between sensors and control units, for example in vehicles, are intended to allow the transfer of a large data volume, depending on the number of functions of a technical facility or a vehicle. In many applications, it is necessary to transfer the data from the sender to the receiver at the highest possible data transfer rate.

At the present time, in vehicles, a bus system is used in the introduction phase, in which data are transferred as messages under the ISO 11898-1:2015 standard, as a CAN protocol specification with CAN FD. The messages are transferred between the bus users of the bus system, such as the sensor, control unit, transducer, etc. For this purpose, the message is transmitted onto the bus in a frame, in which a switch is made between two communication phases. In the first communication phase (arbitration), it is negotiated which of the user stations of the bus system is allowed to transmit its frame onto the bus in the subsequent second communication phase (data phase or transmission of the useful data). With most manufacturers, CAN FD is used in the vehicle at a 500 kbit/s arbitration bit rate and a 2 Mbit/s data bit rate in the first step. During the transfer, a switch is thus to be made back and forth on the bus between a slow operating mode and a fast operating mode.

To allow even higher data rates in the second communication phase, at the present time a successor bus system for CAN FD (referred to as CAN XL) is being developed, which is presently standardized by the CAN in Automation (CiA) organization. In addition to strict data transport, CAN XL is intended to also support other functions via the CAN bus, such as functional safety, data security, and quality of service (QoS). These are basic properties that are required in an autonomously traveling vehicle.

To increase the data rate that is transferable via the bus, the edge steepness of the signal that is coupled onto the bus could be increased. The higher the edge steepness, the greater the electromagnetic radiation becomes. However, radiation of this type must not exceed limiting values with regard to the electromagnetic compatibility (EMC) of the user stations. As a result, the edge steepness cannot be arbitrarily increased. If the intent is to reliably differentiate between voltage differences of the bus signal which are transmitted onto the bus for various bits of a digital signal, it would be possible to select the voltage differences to be as great as possible.

However, the greater the voltage differences, the longer is the duration of transient effects between various voltage differences. As a result, a predetermined bit time or temporal length of the bit for transfer on the bus must be provided so that a signal that is received from the bus may be correctly sampled by a receiver. The temporal length increases with the magnitude of the voltage difference between the various bus states.

Furthermore, errors may occur during the transfer of data in a frame via a channel (CAN bus). For example, a bit may be falsified or edges between bits may be shifted due to external influences, in particular irradiation or reflections at bus ends. In addition, as the result of nonideal clock sources, a phase error may occur in a user station, which for the present communication on the bus is not a sender, but instead, only a receiver of the message (reception node).

These frame conditions contribute to a reduction in the quantity of data that is effectively transferable per unit of time (the net data rate).

SUMMARY

An object of the present invention is to provide a communication control device for a user station for a serial bus system, and a method for communicating in a serial bus system, which solve the above-mentioned problems. In particular, an object is to provide a user station for a serial bus system, and a method for communicating in a serial bus system in which a high level of error robustness of the communication is achievable, even for a high data rate and optionally an increase in the quantity of the useful data per frame.

The object may be achieved by a communication control device for a user station for a serial bus system in accordance with an example embodiment of the present invention. The communication control device is designed to control a communication of the user station with at least one other user station of the bus system, and to generate a transmission signal for transmission onto a bus of the bus system and/or to receive a signal from the bus, the communication control device being designed to generate the transmission signal according to a frame, and the communication control device being designed to generate the transmission signal in such a way that in the transmission signal, the bit time of at least one bit is adapted as a function of an edge height that is to be provided between the at least one bit and the preceding bit in a signal in which the bit is to be transferred via the bus.

The term "bit" stands for a number in a positional notation system or number system on base 2 or some other base such as −3 or less, or 3 or greater.

Due to the embodiment of the communication control device, it is possible to transfer more data per unit of time via the bus than previously without reducing the error robustness of the communication in the bus system. By use of the user station, it is possible to increase the overall data rate by in particular more than 2.5 times.

With the communication control device, in a serial bus system, in particular for CAN or CAN FD or CAN XL, a robust communication may still be made possible at a further increased data rate.

By use of the communication control device in the bus system, it is possible to maintain an arbitration from CAN in a first communication phase and still increase the transfer rate considerably compared to CAN or CAN FD or CAN XL.

The method carried out by the communication control device may also be used when at least one CAN user station and/or at least one CAN FD user station that transmit(s) messages according to the CAN protocol and/or CAN FD protocol are/is present in the bus system.

Advantageous further embodiments of the communication control device and of the user station are disclosed herein.

The edge steepnesses of the edges of the signal that is transferred via the bus may be essentially the same, regardless of the edge height of the edges.

The communication control device possibly also includes a conversion block for converting a logical value of at least two bits of the transmission signal from the binary number system into a logical value in a number system that is based on a number greater than 2, and for generating at least one bit for the transmission signal, and a bit time adaptation block for adapting the bit time of the at least one bit of the transmission signal as a function of the logical value of the at least one bit of the transmission signal.

In one example embodiment of the present invention, the communication control device is designed to shorten in the frame, in comparison to some other bit of the bit sequence, at least one bit that is situated in a bit sequence of at least two bits having the same logical value.

Each bit of the transmission signal may be divided into four segments over time without shortening, a first sampling point for sampling the signal after transfer via the bus being provided between the first segment and the second segment, and a second sampling point for sampling the signal after transfer via the bus being provided between the third segment and the fourth segment.

According to one exemplary embodiment of the present invention, the communication control device is designed to insert at least one predetermined bit into the transmission signal which indicates to a reception node in the bus system that a signal presently received from the bus is modified, at least in sections, in such a way that the at least one bit is adapted as a function of an edge height. The communication control device may also be designed to insert the at least one predetermined bit into a control field of the frame and/or into a data field of the frame.

It is possible for the communication control device to include an error frame counting block for counting error frames that are received from the bus, the communication control device being designed to not adapt a bit time in the transmission signal if the count value of the error frame counting block exceeds a predetermined number.

The communication control device may be designed to generate the transmission signal in such a way that for a message that is exchanged between user stations of the bus system, the bit time of a signal transmitted onto the bus in a first communication phase may be different from a bit time of a signal transmitted in the second communication phase, in the first communication phase it being negotiated which of the user stations of the bus system in the subsequent second communication phase obtains, at least temporarily, exclusive, collision-free access to the bus, and the communication control device being designed to adapt the bit time of at least one bit in the first and/or second communication phase.

The frame that is formed for the message may have a design that is compatible with CAN FD and/or CAN XL.

The communication control device described above is possibly part of a user station that also includes a voltage association module for associating a first voltage value or a second voltage value with the logical value of a bit of the transmission signal for the signal to be transferred via the bus, the voltage association module being designed to associate the logical value, with which the at least one bit in the signal on the bus has the minimum edge height at its start, with the at least one bit for the signal on the bus.

In one embodiment of the present invention, a first voltage value is associated with a first logical value of a first bit in a bit sequence of the transmission signal, and a second voltage value is associated with a second logical value of a second bit of the bit sequence, the first logical value being smaller than the second logical value, and the first voltage value being smaller than the second voltage value.

The user station described above may also include a transceiver device for transmitting the transmission signal onto the bus of the bus system, the transceiver device being designed to transmit the entire frame onto the bus in an operating mode for transmitting and receiving the frame in the first communication phase.

The user station described above may be part of a bus system which also includes a bus and at least two user stations that are connected to one another via the bus in such a way that they may communicate serially with one another. At least one of the at least two user stations is a user station described above.

Moreover, the object stated above may be achieved by a method for communicating in a serial bus system in accordance with an example embodiment of the present invention. The method is carried out using a user station of the bus system including a communication control device. In accordance with an example embodiment of the present invention, the method includes the steps: controlling, via the communication control device, a communication of the user station with at least one other user station of the bus system, and for generating a transmission signal for transmission onto a bus of the bus system and/or receiving a signal from the bus, the communication control device generating the transmission signal according to a frame, the communication control device generating the transmission signal in such a way that in the transmission signal, the bit time of at least one bit is adapted as a function of an edge height that is to be provided between the at least one bit and the preceding bit in a signal in which the bit is transferred via the bus.

The method yields the same advantages as stated above with regard to the communication control device and the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

FIG. 9 shows a diagram for illustrating the design of a message that may be transmitted from a user station of the bus system according to a fourth exemplary embodiment of the present invention.

FIG. 10 shows a diagram for illustrating the design of a message that may be transmitted from a user station of the bus system according to a fifth exemplary embodiment of the present invention.

Unless stated otherwise, identical or functionally equivalent elements are provided with the same reference numerals in the figures.

DETAILED DESCRIPTION OF EXAMPLE EMBODIMENTS

Figure 1:
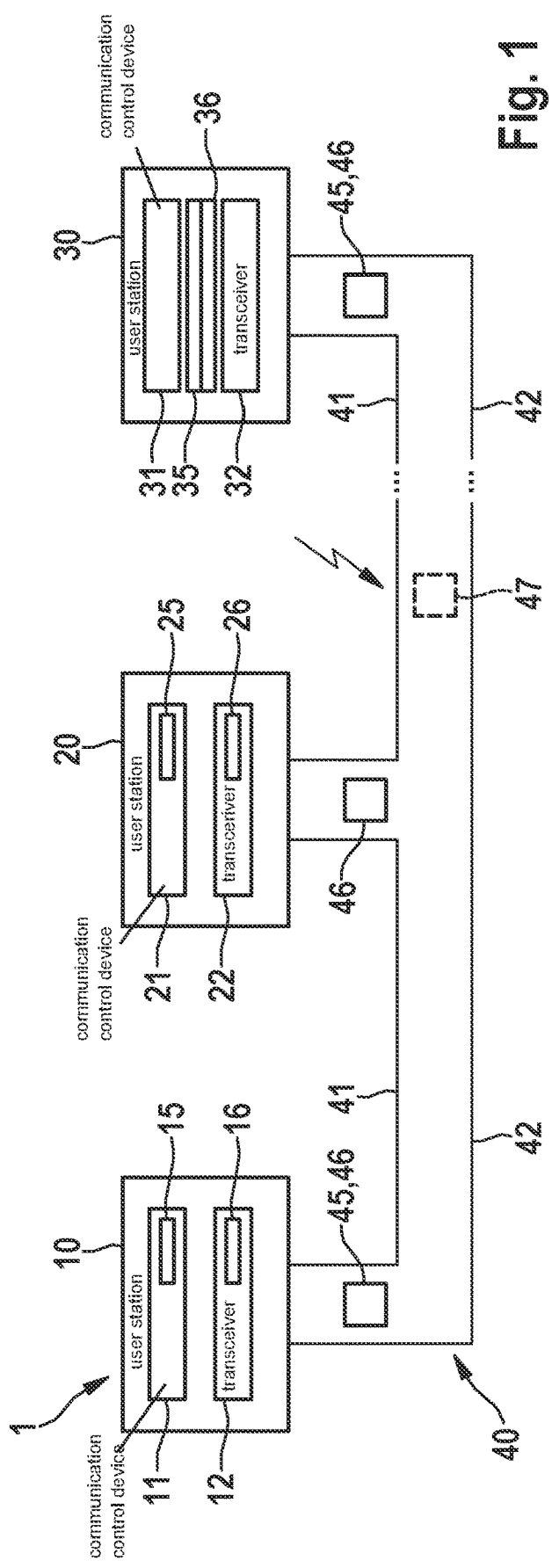
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN XL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN XL_H and CAN XL_L, and are used for electrical signal transfer after coupling in the dominant levels or generating recessive levels or other levels for a signal in the transmission state. Messages 45, 46 in the form of signals are serially transferable between individual user stations 10, 20, 30 via bus 40. If an error occurs during the communication on bus 40, as illustrated by the serrated dark block arrow in FIG. 1, an error frame 47 (error flag) may optionally be transmitted. User stations 10, 20, 30 are, for example, control units, sensors, display devices, etc., of a motor vehicle.

As shown in FIG. 1, user station 10 includes a communication control device 11, a transceiver device 12, a bit time modifier module 15, and a voltage association module 16. User station 20 includes a communication control device 21, a transceiver device 22, and optionally a bit time modifier module 25 and a voltage association module 26. User station 30 includes a communication control device 31, a transceiver device 32, a bit time modifier module 35, and a voltage association module 36. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control devices 11, 31 create and read first messages 45, which are modified CAN messages 45, for example. Modified CAN messages 45 are built up based on a CAN XL format, described in greater detail with reference to FIG. 2, and in which particular bit time modifier module 15, 35 is used. Communication control devices 11, 31 may also be designed to provide a CAN XL message 45 or a CAN FD message 46 for transceiver device 32 or receive it from same, as needed. Particular bit time modifier modules 15, 35 are also used. Communication control devices 11, 31 thus create and read a first message 45 or second message 46, first and second messages 45, 46 differing by their data transmission standard, namely, CAN XL or CAN FD in this case, and being further modified as described below.

Communication control device 21 may be designed as a conventional CAN controller according to ISO 11898-1: 2015, i.e., as a CAN FD tolerant conventional CAN controller or a CAN FD controller. In addition, bit time modifier module 25, which has the same function as bit time modifier modules 15, 35, is optionally present. Communication control device 21 creates and reads second messages 46, for example CAN FD messages 46. CAN FD messages 46 may include 0 to 64 data bytes, which are also transferred at a much faster data rate than with a conventional CAN message. In particular, communication control device 21 is designed as a conventional CAN FD controller.

Transceiver device 22 may be designed as a conventional CAN transceiver according to ISO 11898-1:2015 or as a CAN FD transceiver. In addition, voltage association module 26, which has the same function as voltage association modules 16, 36, is present.

Transceiver devices 12, 32 may be designed to provide messages 45 according to the CAN XL format or messages 46 according to the present CAN FD format for associated communication control device 11, 31 or receive the messages from same, as needed. In addition, voltage association modules 16, 36 are present.

A formation and then transfer of messages 45 having the CAN XL format, in addition to the reception of such messages 45, is achievable by use of the two user stations 10, 30. Message 45 may be further modified, as described below.

Figure 2:
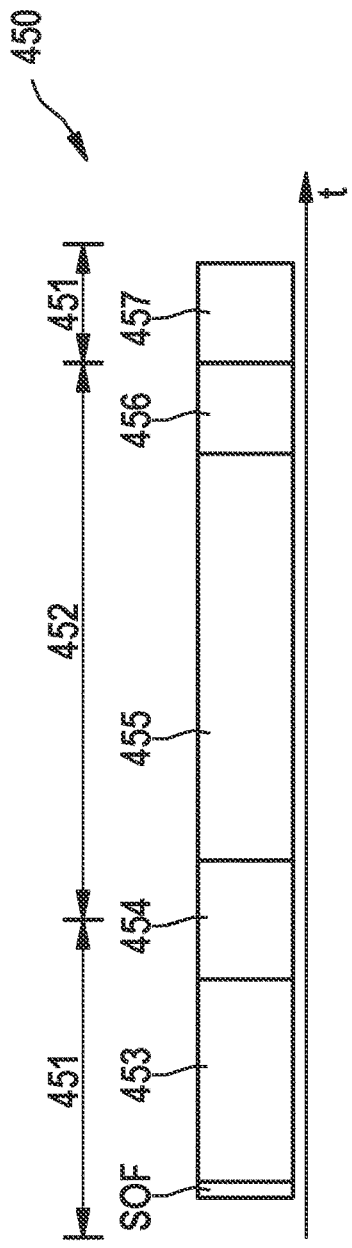
FIG. 2 shows a diagram for illustrating the design of a message that may be transmitted from a user station of the bus system according to the first exemplary embodiment of the present invention.

FIG. 2 shows for message 45 a frame 450, which in particular is a CAN XL frame and which is provided by communication control device 11 for transceiver device 12 for transmitting onto bus 40. In the present exemplary embodiment, communication control device 11 creates frame 450 so as to be compatible with CAN FD. The same analogously applies for communication control device 31 and transceiver device 32 of user station 30.

According to FIG. 2, for the CAN communication on bus 40, frame 450 is divided into different communication phases 451, 452, namely, an arbitration phase 451 and a data phase 452. Frame 450, after a start bit SOF, includes an arbitration field 453, a control field 454, a data field 455, a check sum field 456, and a frame termination field 457.

In arbitration phase 451, with the aid of an identifier ID including, for example, bits ID28 through ID18 in arbitration field 453, bitwise negotiation is carried out between user stations 10, 20, 30 concerning which user station 10, 20, 30 would like to transmit message 45, 46 having the highest priority, and therefore for the next time period for transmitting in subsequent data phase 452 obtains exclusive access to bus 40 of bus system 1. A physical layer, similarly as with CAN and CAN FD, is used in arbitration phase 451. The physical layer corresponds to the bit transfer layer or layer one of the conventional Open Systems Interconnection (OSI) model.

During phase 451, the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

In data phase 452, in addition to a portion of control field 454, the useful data of the CAN XL frame or of message 45 from data field 455 and check sum field 456 are transmitted. Check sum field 456 may contain a check sum of the data of data phase 452, including the stuff bits, which are inserted as an inverse bit by the sender of message 45, in each case after a predetermined number of identical bits, in particular 10 identical bits. At the end of data phase 452, a switch is made back into arbitration phase 451.

At least one acknowledge bit may be contained in an end field in frame termination phase 457. In addition, a sequence of 11 identical bits that indicate the end of CAN XL frame 450 may be present. By use of the at least one acknowledge bit, it may be communicated whether or not a receiver has found an error in received CAN XL frame 450 or message 45.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In a bus system with CAN XL, proven properties that are responsible for the robustness and user-friendliness of CAN and CAN FD, in particular a frame structure including identifiers and arbitration according to the CSMA/CR method, are taken on. Thus, in arbitration phase 451, user station 10 partially uses as the first communication phase, in particular up to and including the FDF bit, a format from CAN/CAN FD according to ISO 11898-1:2015. However, in comparison to CAN or CAN FD, in data phase 452 as the second communication phase, increasing the net data transfer rate, in particular to approximately 10 megabits per second, is possible. In addition, increasing the quantity of the useful data per frame to approximately 2 kbytes or an arbitrary value is possible.

Figure 3:
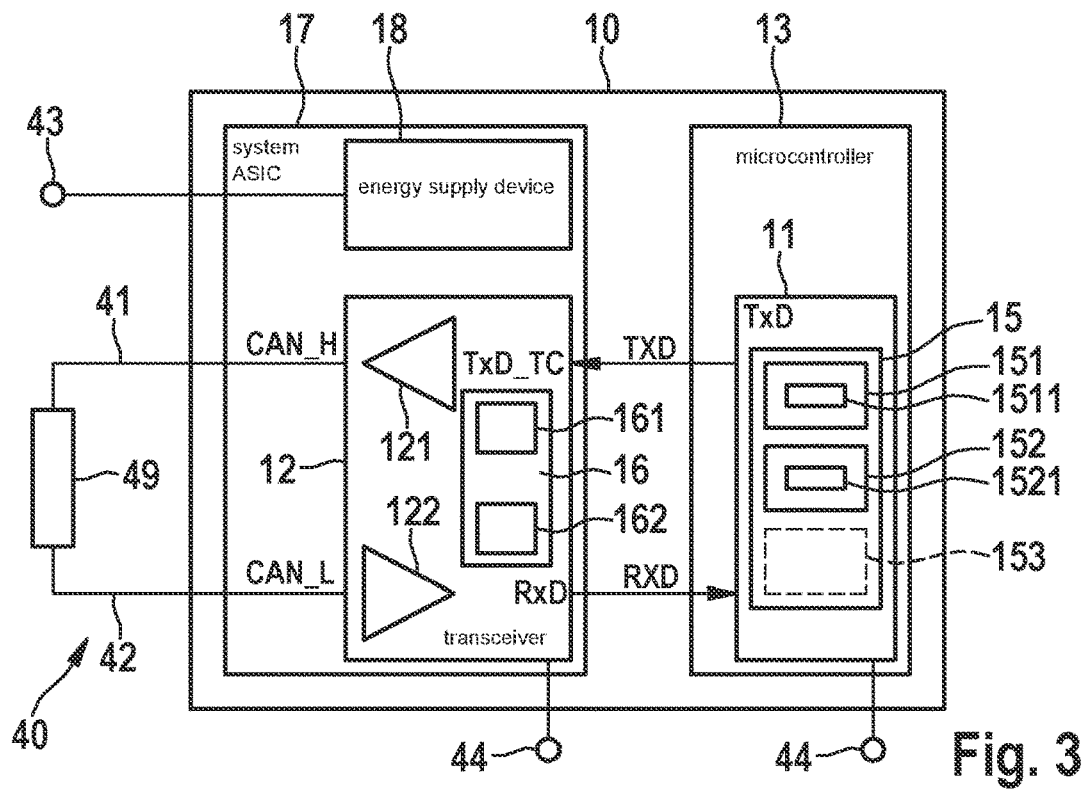
FIG. 3 shows a simplified schematic block diagram of a user station of the bus system according to the first exemplary embodiment of the present invention.

FIG. 3 shows the basic design of user station 10 together with communication control device 11, transceiver device 12, bit time modifier module 15, which is part of communication control device 11, and voltage association module 16, which is part of transceiver device 12. User station 20 has a basic design similar to that shown in FIG. 3, except for the differences stated above. User station 30 has a design similar to that shown in FIG. 3, except that bit time modifier module 35 according to FIG. 1 is situated separately from communication control device 31 and transceiver device 32. The same applies for voltage association module 36. Therefore, user station 30 is not separately described.

According to FIG. 3, in addition to communication control device 11 and transceiver device 12, user station 10 includes a microcontroller 13 with which communication control device 11 is associated, and a system application-specific integrated circuit (ASIC) 17, which alternatively may be a system base chip (SBC) on which multiple functions necessary for an electronics assembly of user station 10 are combined. In addition to transceiver device 12, an energy supply device 18 that supplies transceiver device 12 with electrical energy is installed in system ASIC 17. Energy supply device 18 generally supplies a voltage CAN_Supply of 5 V. However, depending on the requirements, energy supply device 18 may supply some other voltage having a different value. Additionally or alternatively, energy supply device 18 may be designed as a power source.

Bit time modifier module 15 includes a conversion block 151 that converts transmission signal TxD from a bit sequence in binary representation, using a conversion rule 1511, into a bit sequence for which more than two voltage states are provided for bits. In addition, bit time modifier module 15 includes a bit time adaptation block 152 for adapting the bit length or bit time according to a predetermined bit time determination rule 1521, and optionally includes an error frame counting block 153. Blocks 151, 152, 153 are described in greater detail below.

Transceiver device 12 also includes a transmission module 121 and a reception module 122. Even though transceiver device 12 is consistently referred to below, it is alternatively possible to provide reception module 122 in a separate device externally from transmission module 121. Transmission module 121 and reception module 122 may be designed as a conventional transceiver device 12. Transmission module 121 may in particular include at least one operational amplifier and/or one transistor. Reception module 122 may in particular include at least one operational amplifier and/or one transistor. In addition, voltage association module 16 is provided with a transmission block 161 and a reception block 162, as described in greater detail below.

Transceiver device 12 is connected to bus 40, or more precisely, to its first bus wire 41 for CAN_H or CAN XL_H and its second bus wire 42 for CAN_L or CAN XL_L. The supplying of voltage for energy supply device 18 for supplying first and second bus wires 41, 42 with electrical energy, in particular with voltage CAN Supply, takes place via at least one terminal 43. The connection to ground or CAN GND is achieved via a terminal 44. First and second bus wires 41, 42 are terminated via a terminating resistor 49.

In transceiver device 12, first and second bus wires 41, 42 are not just connected to transmission module 121, also referred to as a transmitter, but also to reception module 122, also referred to as a receiver, even though the connection in FIG. 3 is not shown for simplification. In addition, first and second bus wires 41, 42 in transceiver device 12 are connected to voltage association module 16, in particular to transmission block 161 and to reception block 162.

Figure 4:
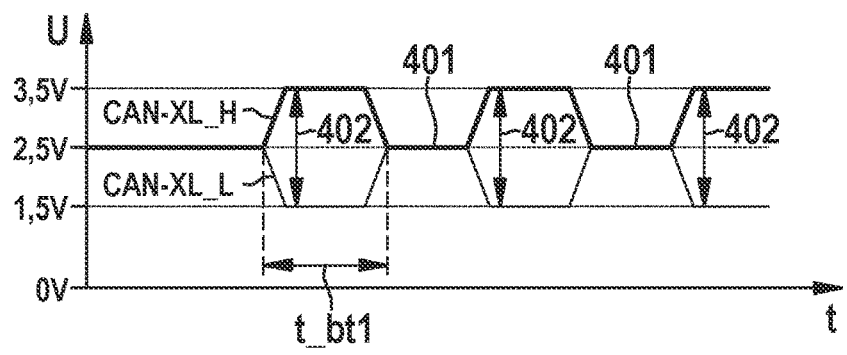
FIG. 4 shows a temporal profile of bus signals CAN XL_H and CAN XL_L for the user station according to the first exemplary embodiment of the present invention.

During operation of bus system 1, transmission module 121 converts a transmission signal TXD or TxD_TC of communication control device 11 into corresponding signals CAN XL_H and CAN XL_L for bus wires 41, 42, and transmits these signals CAN XL_H and CAN XL_L onto bus 40 at the terminals for CAN_H and CAN_L, as shown in FIG. 4. At least in data phase 452, transmission signal TXD or TxD_TC is converted from voltage association module 16, in particular via transmission block 161, into signals for first and second bus wires 41, 42 and is transmitted onto bus 40 at the terminals for CAN_H and CAN_L. For this purpose, transmission block 161 includes at least one operational amplifier and/or one transistor.

According to FIG. 4, reception module 122 forms a reception signal RXD or RxD from signals CAN XL_H and CAN XL_L that are received from bus 40, and passes it on to communication control device 11, as shown in FIG. 3. At least in data phase 452, reception block 162 of voltage association module 16 forms reception signal RXD or RxD and passes it on to communication control device 11. For this purpose, reception block 162 includes at least one operational amplifier and/or one transistor. With the exception of an idle or standby state, transceiver device 12 with reception module 122 and/or reception module 162 during normal operation always listens to a transfer of data or messages 45, 46 on bus 40, in particular regardless of whether or not transceiver device 12 is the sender of message 45.

According to the example from FIG. 4, signals CAN XL_H and CAN XL_L, at least in arbitration phase 451, include dominant and recessive bus levels 401, 402, as from CAN. A difference signal VDIFF=CAN XL_H−CAN XL_L, shown in FIG. 5 for arbitration phase 451, is formed on bus 40. The individual bits of signal VDIFF with bit time t_bt1 may be recognized in arbitration phase 451 using a reception threshold T_a of 0.7 V. In data phase 452 the bits of signals CAN XL_H and CAN XL_L are transmitted more quickly, i.e., with a shorter bit time t_bt2, than in arbitration phase 451. Thus, signals CAN XL_H and CAN XL_L in data phase 452 differ from conventional signals CAN_H and CAN_L, at least in their faster bit rate.

Figure 5:
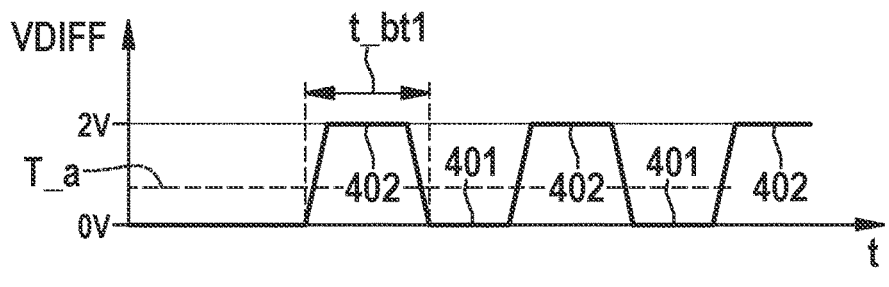
FIG. 5 shows a temporal profile of a differential voltage VDIFF of bus signals CAN XL_H and CAN XL_L for the user station according to the first exemplary embodiment of the present invention.

The sequence of states 401, 402 for signals CAN XL_H, CAN XL_L in FIG. 4 and the resulting pattern of voltage VDIFF from FIG. 5 are used only for illustrating the function of user station 10. The sequence of data states for bus states 401, 402 is selectable as needed.

In other words, transmission module 121, when it is switched into a first operating mode B_451 (SLOW), according to FIG. 4 generates a first data state as bus state 402 with different bus levels for two bus wires 41, 42 of the bus line, and a second data state as bus state 401 with the same bus level for the two bus wires 41, 42 of the bus line of bus 40.

In addition, transmission module 121 or transmission module 162 transmits the bits onto bus 40 at a higher bit rate for the temporal profiles of signals CAN XL_H, CAN XL_L in a second operating mode B_452_TX (FAST_TX), which includes data phase 452. CAN XL_H and CAN XL_L signals may also be generated in data phase 452 with a different physical layer than with CAN FD. The bit rate in data phase 452 may thus be increased even further than with CAN FD. A user station that is not a sender of frame 450 in data phase 452 sets a third operating mode B_452_RX (FAST_RX) in its transceiver device.

Bit time modifier module 15 from FIG. 3 is active when user station 10 acts as sender and/or receiver of frame 450. Bit time modifier module 15, in particular its conversion block 151, converts the bit sequences in frame 450 from the binary number system into some other number system whose number base is greater than 2, before communication control device 11 passes on a TxD signal as a TxD_TC signal at terminal TXD to transceiver device 12 for transmission onto bus 40.

For example, conversion block 151, using conversion rule 1511, converts a binary bit sequence $1101001011101110_{(2)}$ from 16 bits into a number system on base 3 or 4 or 5, etc. In the example from FIG. 6, the converted bit sequence in a base 5 system contains the logical values or numbers $3211443_{(5)}$, and thus only seven bits.

In addition, bit time modifier module 15, in particular its bit time adaptation block 152, may adapt the bits of the TxD signal for the TxD_TC signal. Voltage association module 16, in particular transmission block 161, associates a predetermined voltage value with each bit in above-mentioned bit sequence $3211443_{(5)}$ in the base 5 system, using association rule 1521. This is described in greater detail below with reference to FIG. 6.

The method carried out by bit time modifier module 15 and voltage association module 16 is particularly suitable for data phase 452, where one of user stations 10, 20, 30 has exclusive access to bus 40 in order to transmit one of messages 45, 46, in particular as frame 450. However, at least in some cases, modules 15, 16 may alternatively or additionally use the method in arbitration phase 451.

Figure 6:
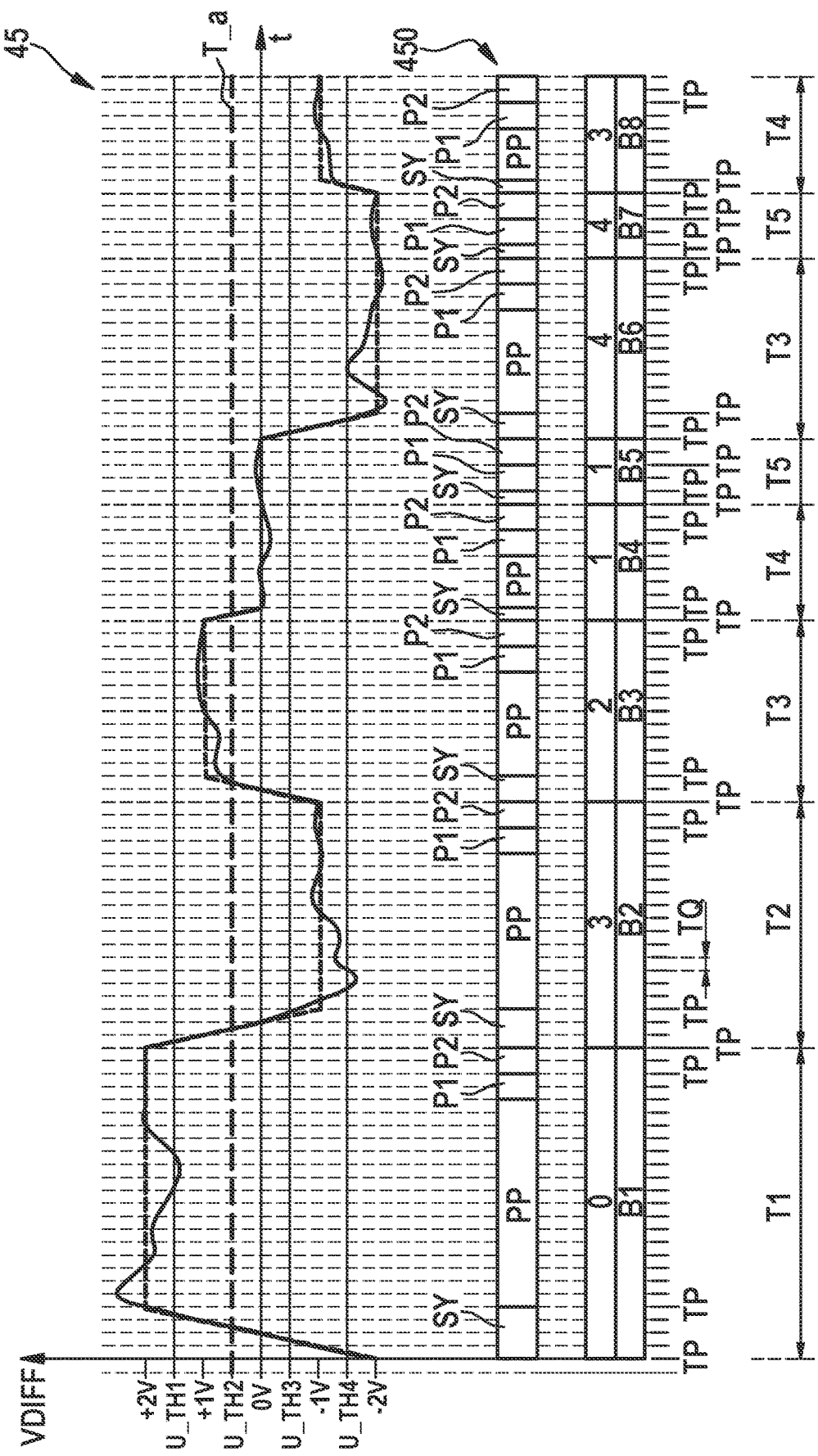
FIG. 6 shows a temporal profile of a portion of a signal that occurs during transmission of a frame to terminals of the user station according to the first exemplary embodiment of the present invention.

FIG. 6 shows, as a function of time t, an example of a difference signal VDIFF that has formed due to a digital transmission signal TxD or TxD_TC on bus 40. Transmission signal TxD may be generated either according to frame 450 or according to the protocol for CAN FD.

At the start, the bit sequence shown includes one bit 1 having the logical value 0, which is followed by the seven bits B2 through B8 having the logical values or numbers $3211443_{(5)}$ according to the base 5 system.

Voltage association module 16 has associated a predetermined voltage value for signal VDIFF with each logical value or number in bit sequence $03211443_{(5)}$ in signal TxD_TC. Transmission module 162 has accordingly transmitted bit sequence $03211443_{(5)}$ onto bus 40, so that the signal from FIG. 6 has formed on bus 40. Voltage value +2 V is associated with the number 0. For this purpose, transmission module 162 may include a circuit including at least one operational amplifier and/or at least one transistor. Voltage value +1 V is associated with the number 1. Voltage value +1 V is associated with the number 2. Voltage value −1 V is associated with the number 3. Voltage value −2 V is associated with the number 4.

In reception signal RxD, voltage association module 16, in particular its reception module 162, associates the numerical values corresponding to bit sequence $03211443_{(5)}$ with the corresponding voltages of difference signal VDIFF, with error-free reception. Voltage association module 16, in particular its reception module 162, uses reception thresholds U_TH1, U_TH2, U_TH3, U_TH4 for this purpose. These reception thresholds may be implemented in a circuit including at least one operational amplifier and/or at least one transistor.

Bits B1 through B8 in FIG. 6 are each divided into a plurality of time quanta TQ. At least one time quantum is associated with one of multiple segments SY, PP, P1, P2. Each bit B1 through B8 in FIG. 6 includes at least segments SY, P1, P2. Thus, each bit B1 through B8 in FIG. 6 includes at least three segments.

A synchronization segment SY including 1 to 4 time quanta TQ, depending on the bit, is provided at the start of a bit B1 through B8. This is followed by a propagation segment PP that includes multiple time quanta TQ. A first sampling point TP for sampling the bit is situated between segment SY and segment PP. Segment PP is followed by a first phase P1 prior to a second sampling point TP for sampling the bit. Second sampling point TP is followed by a second phase P2. If a transition between two different logical values occurs in transmission signal TxD or signal RxD that is received from the bus, i.e., between 1 and 0 or between 0 and 1, a reception node or receiver of frame 450 may check whether or not the transition occurs at an expected time. If the transition does not occur at the expected time, which is at the start of the bit, the receiver of frame 450 may compute the time difference and adjust the temporal length of phase P1 or the temporal length of phase P2, depending on the result. In this way, the receiver may continuously synchronize with the time clocking of the transmission node or sender of frame 450. This reduces errors that occur due to irradiation on bus 40 (physical layer effects).

Communication control device 11 is designed to sample, in a signal RxD received from bus 40, a bit B1 through B8 at first sampling point TP and at second sampling point TP, each of which is situated between two of segments SY, PP, P1, P2.

Bits B1 through B8 in FIG. 6 each have the same edge steepness but different edge heights. In general, the edge steepnesses are essentially identical. In particular, transceiver device 12 drives signal VDIFF, having edges with the same edge steepness, onto bus 40. The edge height between the individual bits corresponds to the difference of the voltage values of VDIFF of directly successive bits between which the edge is situated. The greater the edge height, the longer are the durations of segments SY, PP, P1, P2 over time t that have been selected by bit time adaptation module 152. Bit time adaptation module 152 has selected the temporal length of segments SY, PP as a function of the edge height. In contrast, bit time adaptation module 152 has selected the length of segments P1 and P2 independently of the edge height of the associated bit. Segments P1, P2 may be used to synchronize the clocks of the individual user stations of bus system 1.

Bit B1 has the logical value 0 and a rising edge with an edge height of 4 volts, situated between the voltage values of −2 V and +2 V. Segment SY of bit B1 thus extends over 4 time quanta TQ. Segment PP of bit B1 extends over 16 time quanta TQ. Bit B1 has a bit length or bit time T1.

Bit B2 has the logical value 3 and a falling edge with an edge height of 3 volts, situated between the voltage values of +2 V and −1 V. Segment SY of bit B2 thus extends over 3 time quanta TQ. Segment PP of bit B2 extends over 12 time quanta TQ. Bit B2 has a bit length or bit time T2.

Bit B3 has the logical value 2 and a rising edge with an edge height of 2 volts, situated between the voltage values of −1 V and +1 V. Segment SY of bit B3 thus extends over 2 time quanta TQ. Segment PP of bit B3 extends over 8 time quanta TQ. Bit B3 has a bit length or bit time T3.

Bit B4 has the logical value 1 and a falling edge with an edge height of 1 volt, situated between the voltage values of +1 V and 0 V. Segment SY of bit B4 thus extends over 1 time quantum TQ. Segment PP of bit B4 extends over 4 time quanta TQ. Bit B4 has a bit length or bit time T4.

Bit B5 has the logical value 1, and therefore has an edge height of 0 volt due to preceding bit B4 having the same logical value. Segment SY of bit B5 thus extends over 1 time quantum TQ. Bit B5 also includes no segment PP. Bit B5 has a bit length or bit time T5.

Bit B6 has the logical value 4 and a falling edge with an edge height of 2 volts, situated between the voltage values of 0 V and −2 V. Segment SY of bit B6 thus extends over 2 time quanta TQ. Segment PP of bit B6 extends over 8 time quanta TQ. Bit B6 has bit length or bit time T3.

Bit B7 has the logical value 4, and therefore has an edge height of 0 volt due to preceding bit B6 having the same logical value. Segment SY of bit B7 thus extends over 1 time quantum TQ. Bit B7 also includes no segment PP. Bit B7 has a bit length or bit time T5.

Bit B8 has the logical value 3 and a rising edge with an edge height of 1 volt, situated between the voltage values of −2 V and −1 V. Segment SY of bit B8 thus extends over 1 time quantum TQ. Segment PP of bit B4 extends over 4 time quanta TQ. Bit B8 has a bit length or bit time T4.

Thus, for the bit sequence in the base 5 system as shown in FIG. 6, five different voltage states are present on bus 40. Voltage association module 16 thus associates five different voltage values, namely, +2 V, +1 V, 0 V, −1 V, −2 V, for corresponding voltage states on bus 40. In addition, bit time adaptation module 152 has adapted the bits of transmission signal TxD_TC to five different bit lengths or bit times, namely, bit times T1 through T5. Bit time adaptation module 152 determines the adaptation according to a corresponding rule 1521, which takes into account the changes between the numbers 0 through 4. Bit time adaptation module 152 adapts the temporal length or bit time of the bits in such a way that signal VDIFF has differential voltages whose temporal duration is a function of the previous level of the change in differential voltage.

In the example from FIG. 6, in the range from +2 V to −2 V, selected differential voltages VDIFF have edge jumps of 0 V to 4 V, depending on the bit sequence. This may result in relatively long bit times, for example bit time T1, or in relatively short bit times, for example bit time T5. However, numerical sequence $03211443_{(5)}$ from FIG. 6 includes only 99 time quanta TQ.

The data rate for the present exemplary embodiment may be greatly increased in comparison to the related art. In particular, the data rate may be increased by as much as 21% in comparison to a technique in which, for example, a maximum differential voltage of 1 V is used, as with LVCAN, and additional bit time compression.

Of course, bits B1 through B8 may be shortened by (an)other temporal length(s) than described above. In particular, shortening by the temporal length of a segment P1 or some other arbitrary length that is between the lengths of segments PP, P1 is possible. Alternatively, at least one of bits B1 through B8 may be shortened by a temporal length that is less than segment P1.

If user station 10 is a receiving user station of bus system 1, which at the present time is not a sender of frame 450, but instead only receives frame 450 (reception node), user station 10 via its bit time adaptation module 152 recognizes the shortened bit length of dominant bits B1 by sampling at sampling points TP of reception signal RxD. In particular, the communication control device samples reception signal RxD after each time quantum TQ. As a result, a reception node may correctly sample the bits of signal VDIFF according to FIG. 6 which the reception node receives from bus 40 at its terminals CAN_H, CAN_L. Optionally, bit time adaptation module 152 may once again lengthen bits B1 of reception signal RxD, recognized as shortened, to the normal length in the binary number system. However, communication control device 11 alternatively evaluates reception signal RxD using the bits having different lengths.

By use of this embodiment of user stations 10, 20, 30 of bus system 1, more bits may be transferred via bus 40 in the same time period. The data rate in bus system 1 is thus increased.

If a user station 10, 20, 30 that does not understand the bit time shortening is to be at bus 40, this user station 10, 20, 30 will disturb the communication in bus system 1 via error frames 47 when one of bit length adaptation modules 15, 25, 35 is active for a transmission signal TxD. In such a case, error frame counting block 153 counts error frames 47 received from bus 40. Beginning at a certain number of error frames 47, bit time modifier module 15 evaluates that the method is no longer used for shortening the bits or bit sequences. Instead, communication control device 11 then uses only the conventional protocol, in which no shortening of bits or bit sequences is used. Associated bit length adaptation module 15, 25, 35 of user station 10, 20, 30 is thus deactivated.

A robust emergency operation of the communication in bus system 1 is thus possible. This is advantageous in particular when bus system 1 is used in a vehicle. The emergency operation is then ensured, for example, while the vehicle is traveling.

Communication control device 11, in particular its bit time modifier module 15, may reduce the count value of error frame counting block 153 when a message 45 that includes shortened bits or bit sequences is successfully sent. In this way, sporadic errors that are not caused by an incompatibility of the communication protocols of user station 10, 20, 30 at bus 40 do not result in a reduction in the possible transferable baud rate in bus system 1.

In contrast, for a software update of the vehicle in a repair shop, it may be desired to work using the highest possible data rate. This may be the case when the data of the new software are of interest only for an individual user station at bus 40. For such a case, it is possible for a repair shop tester to use the above-described method for shortening the bits or bit sequences in a targeted manner during the transmission of messages 45, 46 in bus 40 until the incompatible user station(s) prevent(s) the transmission of error frames 47 and go(es) into an error state of exception. Beginning at this point in time, communication control device 11 may use the above-described described method for shortening the bits or bit sequences undisturbed during the transmission of messages 45, 46 according to FIG. 6. The software update may thus be transferred in a shorter time than with conventional messages 45, 46 including bits of normal length.

Figure 7:
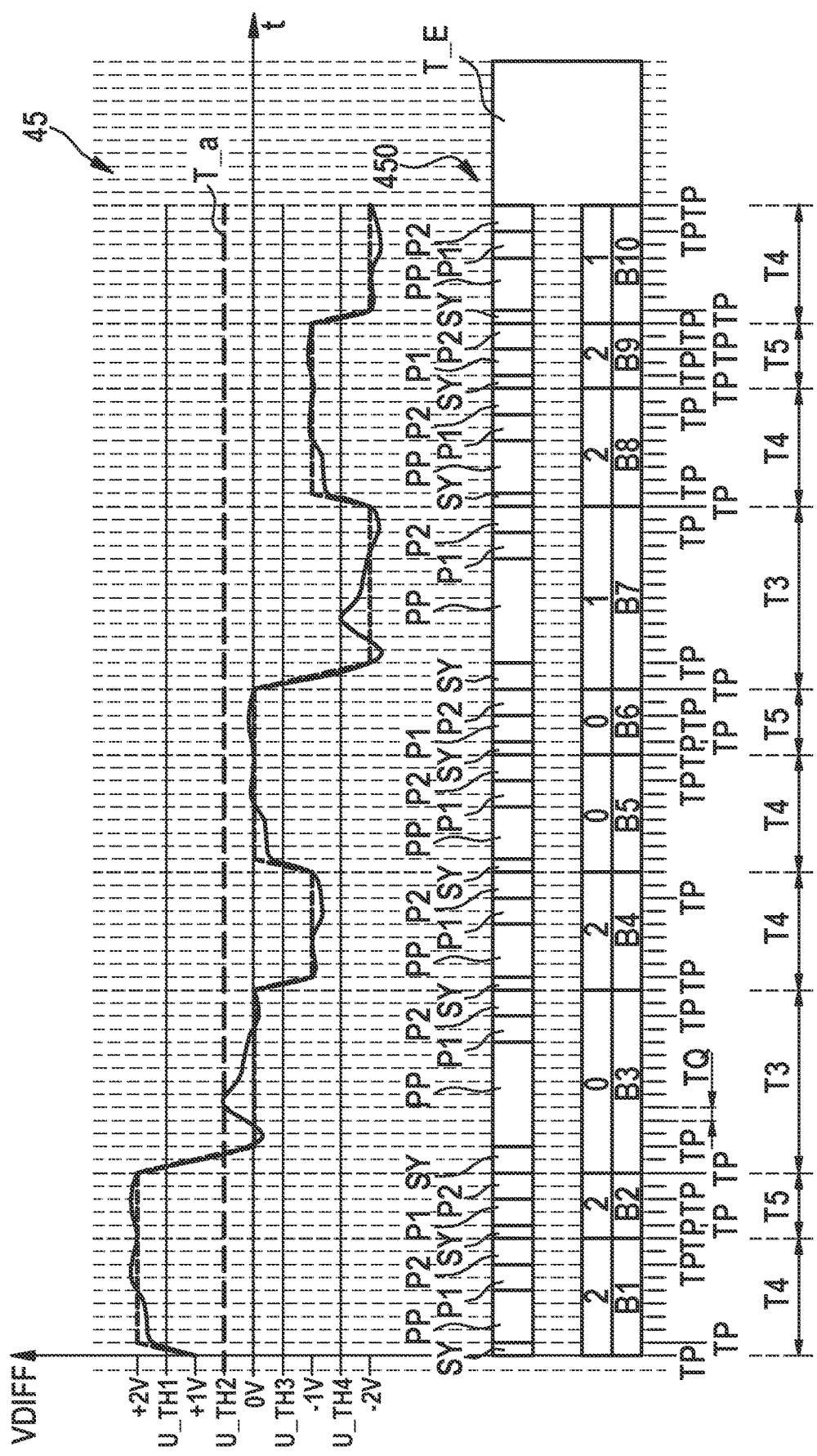
FIG. 7 shows a temporal profile of a portion of a signal that occurs during transmission of a frame to terminals of the user station according to a second exemplary embodiment of the present invention.

With regard to a second exemplary embodiment, FIG. 7 shows, as a function of time t, an example of a difference signal VDIFF that has formed due to a digital transmission signal TxD or TxD_TC on bus 40. Transmission signal TxD may be generated either according to frame 450 or according to the protocol for CAN FD.

The bit sequence shown includes ten bits, namely, bits B1 through B10. The bits in a base 3 system have logical values or numbers $2202001221_{(3)}$. This numerical sequence also corresponds to numerical sequence $1101001011101110_{(2)}$ in the binary number system and to the numerical sequence or bit sequence $3211443_{(5)}$ from FIG. 6 according to the base 5 system.

Voltage association module 16 has associated up to two predetermined voltage values for signal VDIFF on bus 40 with each logical value or number in bit sequence $2202001221_{(3)}$. The two voltage values +2 V and −1 V are associated with the number 2. The two voltage values +1 V and −2 V are associated with the number 1. The voltage value 0 V is associated with the number 0. The association takes place in such a way that in each case the smallest possible edge height is generated between two successive bits.

In reception signal RxD, voltage association module 16, in particular its reception module 162, associates the numerical values corresponding to bit sequence $2202001221_{(3)}$ with the corresponding voltages of difference signal VDIFF, with error-free reception. Voltage association module 16, in particular its reception module 162, uses reception thresholds U_TH1, U_TH2, U_TH3, U_TH4 for this purpose.

As a result, only the numbers 0, 1, 2 may be contained in transmission signal TxD_TC and transferred via bus 40. Therefore, bit time adaptation module 152 may adapt the durations of segments SY, PP, P1, P2 over time t in such a way that in the example from FIG. 7, only bits having shorter bit lengths or bit times T3 through T5 are present.

Thus, for the bit sequence in the base 3 system as shown in FIG. 7, five different voltage states are once again present on bus 40. Voltage association module 16 thus associates five different voltage values, namely, +2 V, +1 V, 0 V, −1 V, −2 V, for corresponding voltage states on bus 40. However, bit time adaptation module 152 may adapt the bits of transmission signal TxD_TC to only three different bit lengths or bit times, namely, bit times T3 through T5. Bit time adaptation module 152 determines the adaptation according to corresponding rule 1521, which takes into account the changes between the numbers 0 through 2.

In the example from FIG. 7, in the range from +2 V to −2 V, selected differential voltages VDIFF have edge jumps of 0 V to 2 V, depending on the bit sequence. Due to resulting shorter bit times T3 through T5, the duration of numerical sequence $3211443_{(5)}$ or $2202001221_{(3)}$ from FIG. 7 is now only 88 time quanta TQ. A time period T E for the transfer on bus 40 is thus saved in comparison to the example from FIG. 6.

The data rate for the present exemplary embodiment may be greatly increased even more in comparison to the example from FIG. 6. In particular, the data rate may be increased by as much as 36% in comparison to the technique in which, for example, a maximum differential voltage of 1 V is used, as with LVCAN, and additional bit time compression.

Figure 8:
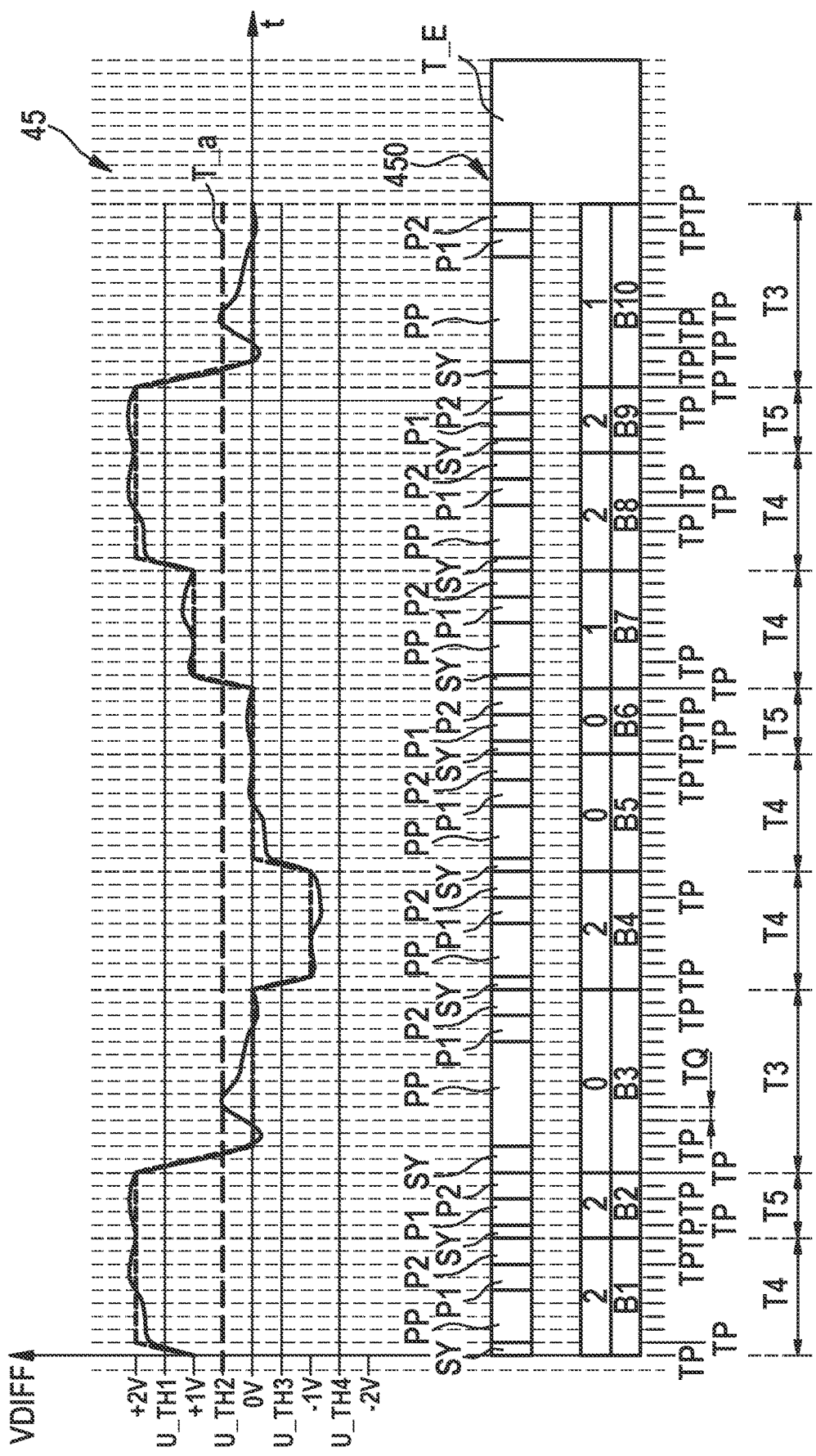
FIG. 8 shows a temporal profile of a portion of a signal that occurs during transmission of a frame to terminals of the user station according to a third exemplary embodiment of the present invention.

With regard to a third exemplary embodiment, FIG. 8 shows, as a function of time t, an example of a difference signal VDIFF that has formed due to a digital transmission signal TxD or TxD_TC on bus 40. Transmission signal TxD may be generated either according to frame 450 or according to the protocol for CAN FD.

The same logical values are associated with the bit sequence from FIG. 8 as for FIG. 7. Bits B1 through B10 in a base 3 system thus have logical values or numbers $2202001221_{(3)}$, as described above.

Voltage association module 16 has associated up to two predetermined voltage values for signal VDIFF on bus 40 with each logical value or number in bit sequence $2202001221_{(3)}$. The two voltage values +2 V and −1 V are associated with the number 2. The voltage value +1 V is associated with the number 1. The voltage value 0 V is associated with the number 0. Thus, the additional differential voltage of −2 volts is not necessary.

In reception signal RxD, voltage association module 16, in particular its reception module 162, associates the numerical values corresponding to bit sequence $2202001221_{(3)}$ with the corresponding voltages of difference signal VDIFF, with error-free reception. Voltage association module 16, in particular its reception module 162, uses reception thresholds U_TH1, U_TH2, U_TH3 for this purpose. However, reception threshold U_TH4 is not necessary.

As a result, only the numbers 0, 1, 2 may be contained in transmission signal TxD_TC and transferred via bus 40. Therefore, bit time adaptation module 152 may adapt the durations of segments SY, PP, P1, P2 over time t in such a way that in the example from FIG. 8, only bits having shorter bit lengths or bit times T3 through T5 are present.

Thus, for the bit sequence in the base 3 system as shown in FIG. 8, only four different voltage states are now present on bus 40. Voltage association module 16 thus associates four different voltage values, namely, +2 V, +1 V, 0 V, −1 V, for corresponding voltage states on bus 40. However, bit time adaptation module 152 may adapt the bits of transmission signal TxD_TC to only three different bit lengths or bit times, namely, bit times T3 through T5. Bit time adaptation module 152 determines the adaptation according to corresponding rule 1521, which takes into account the changes between the numbers 0 through 2.

In the example from FIG. 7, in the range from +2 V to −1 V, selected differential voltages VDIFF have edge jumps of 0 V to 2 V, depending on the bit sequence. Due to resulting shorter bit times T3 through T5, numerical sequence $3211443_{(5)}$ or $2202001221_{(3)}$ from FIG. 8 in fact has the same duration as for the example from FIG. 7, namely, only 88 time quanta TQ.

However, for a message 45, 46, low numbers, in particular zeroes, statistically occur more frequently than high numbers, for example 2. Therefore, in the embodiment from FIG. 8, low absolute differential voltages are associated with low numbers such as 0 and 1. For example, a voltage of 0 V is namely associated with the number 0. As a result, the signal from FIG. 8 may be transferred via bus 40 in a particularly power-saving manner, and thus in an energy-saving manner.

For the present exemplary embodiment, the data rate may thus be increased in a more energy-saving manner in comparison to the example from FIG. 7.

FIG. 9 shows a frame 450A according to a fourth exemplary embodiment. Frame 450A may be used by communication control device 11 to generate transmission signal TxD and/or to evaluate reception signal RxD, as described above.

In frame 450A, at least one bit B_V is contained in control field 454. The fewer bits B_V that are contained, the less the transferable net data rate in bus system 1 is lowered.

The at least one bit B_V indicates whether or not the bits or bit sequences in a reception signal RxD, presently received from bus 40, are to be transmitted in shortened form.

Thus, a transmission node may communicate to a reception node at bus 40, which includes the at least one bit B_V, how presently received reception signal RxD is to be evaluated. The reception node may thus correctly take into account predetermined rules 1521, 1511 when evaluating presently received reception signal RxD.

In other words, the use of the above-described method of shortening the bits or bit sequences according to FIG. 6 or FIG. 7 or FIG. 8 may be announced via a reserved bit in the header of a message 45.

The downward compatibility with conventional communication protocols, in particular CAN-based protocols, is thus ensured.

Alternatively, the at least one bit B_V is contained in data field 455.

FIG. 10 shows a frame 450B according to a third exemplary embodiment. Frame 450B may be used by communication control device 11 to generate transmission signal TxD and/or to evaluate reception signal RxD, as described above.

In frame 450B, at least one bit B_V is contained in data field 455. The at least one bit B_V indicates that in a message 45 that is soon to be transmitted via bus 40, the bits or bit sequences are transmitted in shortened form. Thus, a reception node knows that the bits or bit sequences are shortened in a subsequent reception signal RxD, as shown in FIG. 7.

If more than one bit B_V is contained, it may be communicated which message 45, 46 of the subsequent messages at bus 40 is modified in such a way that the bits or bit sequences are shortened. For example, a specific identifier for this message 45, 46 may then be encoded in a bit sequence of at least two bits B_V.

A transmission node may thus communicate to a reception node containing bit B_V how reception signal RxD of next message 45, 46 received from bus 40 is to be evaluated. The reception node may thus correctly take into account predetermined rule 1511, 1521 when evaluating this reception signal RxD.

In other words, the use of the above-described method of shortening the bits or bit sequences, as shown in FIG. 6 or FIG. 7 or FIG. 8, may have been announced for present reception signal RxD in a preceding message.

It is possible to use, at least in sections, shortened bits or bit sequences also in the message that has been created based on a frame 450B.

The downward compatibility with conventional communication protocols, in particular CAN-based protocols, is thus also ensured.

All of the above-described embodiments of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Of course, the at least one of user stations 10, 20, 30 may have some other design in order to generate signal VDIFF for the bus, as described above. For example, at least one of modules 15, 25, 35 is at least partially situated in associated transceiver device 12, 22, 32.

Although the present invention is described above with the example of the CAN bus system, the present invention may be employed for any communications network and/or communication method in which two different communication phases are used in which the bus states, which are generated for the different communication phases, differ.

In particular, bus system 1 according to the exemplary embodiments may be a communications network in which data are serially transmittable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or multiple of user stations 10 or 30 to be present in bus system 1. It is possible for all user stations in bus system 1 to have the same design, i.e., for only user station 10 or only user station 30 to be present.

What is claimed is:

1. A communication control device for a user station for a serial bus system, the communication control device configured to:
   control a communication of the user station with at least one other user station of the bus system, and generate a transmission signal for transmission onto a bus of the bus system and/or receive a signal from the bus;

the communication control device being configured to generate the transmission signal according to a frame, and generate the transmission signal in such a way that in the transmission signal, a bit time of at least one bit is adapted as a function of an edge height of an edge that is to be provided between the at least one bit and a preceding bit in a signal in which the bit is to be transferred via the bus;

wherein the bit time is a time duration, and the edge height of an edge is a difference between voltage levels of directly successive bits between which the edge is situated; and wherein the communication control device is configured to insert at least one predetermined bit into the transmission signal which indicates to a reception node in the bus system that a signal presently received from the bus is modified, at least in sections, in such a way that the at least one bit is adapted as a function of the edge height.

2. The communication control device as recited in claim 1, wherein the edge steepnesses of edges of the signal that is transferred via the bus are the same regardless of an edge height of the edges.

3. The communication control device as recited in claim 1, further comprising:

a conversion block configured to convert a logical value of at least two bits of the transmission signal from a binary number system into a logical value in a number system that is based on a number greater than 2, and to generate the at least one bit for the transmission signal; and a bit time adaptation block configured to adapt the bit time of the at least one bit of the transmission signal as a function of the logical value of the at least one bit of the transmission signal.

4. The communication control device as recited in claim 1, wherein the communication control device is configured to shorten, in comparison to some other bit of a bit sequence, at least one bit in the frame that is situated in a bit sequence of at least two bits having the same logical value, wherein the bit sequence is a sequence of successive bits.

5. The communication control device as recited in claim 1, wherein each bit of the transmission signal is divided into four segments over time without shortening, a first sampling point for sampling the transmission signal after transfer via the bus is provided between a first segment of the segments and a second segment of the segments, and a second sampling point for sampling the transmission signal after transfer via the bus is provided between a third segment of the segments and a fourth segment of the segments.

6. The communication control device as recited in claim 1, wherein the communication control device is configured to insert the at least one predetermined bit into a control field of the frame and/or into a data field of the frame.

7. The communication control device as recited in claim 1, wherein the communication control device includes an error frame counting block configured to counting error frames that are received from the bus, and the communication control device is designed to not adapt the bit time of bits in the transmission signal when a count value of the error frame counting block exceeds a predetermined number.

8. The communication control device as recited in claim 1, wherein the communication control device is configured to generate the transmission signal in such a way that for a message that is exchanged between user stations of the bus system, the bit time of bits in a signal transmitted onto the bus in a first communication phase may be different from the bit time of bits in a signal transmitted in the second communication phase, and wherein in the first communication phase, it is negotiated which of the user stations of the bus system in a subsequent second communication phase obtains, at least temporarily, exclusive, collision-free access to the bus, and wherein the communication control device is configured to adapt the bit time of at least one bit in the first and/or second communication phase.

9. A user station, comprising:

a communication control device configured to:

control a communication of the user station with at least one other user station of the bus system, and generate a transmission signal for transmission onto a bus of the bus system and/or receive a signal from the bus, the communication control device being configured to generate the transmission signal according to a frame, and generate the transmission signal in such a way that in the transmission signal, a bit time of at least one bit is adapted as a function of an edge height of an edge that is to be provided between the at least one bit and a preceding bit in a signal in which the bit is to be transferred via the bus, wherein the bit time is a time duration, and the edge height of an edge is a difference between voltage levels of directly successive bits between which the edge is situated, and wherein the communication control device is configured to insert at least one predetermined bit into the transmission signal which indicates to a reception node in the bus system that a signal presently received from the bus is modified, at least in sections, in such a way that the at least one bit is adapted as a function of the edge height; and a voltage association module configured to associate a first voltage value or a second voltage value with a logical value of a bit of the transmission signal for the signal to be transferred via the bus, the voltage association module being configured to associate the logical value, with which the at least one bit in the signal on the bus has a minimum edge height at its start, with the at least one bit for the signal on the bus, wherein the first voltage value and the second voltage values are different voltage levels.

10. The user station as recited in claim 9, wherein the first voltage value is associated with a first logical value of a first bit in a bit sequence of the transmission signal, the second voltage value is associated with a second logical value of a second bit of the bit sequence, the first logical value being smaller than the second logical value, and the first voltage value being smaller than the second voltage value, wherein the bit sequence is a sequence of successive bits.

11. The user station as recited in claim 9, wherein the frame that is formed for the message is compatible with CAN FD and/or CAN XL.

12. The user station as recited in claim 9, further comprising:

a transceiver device configured to transmit the transmission signal onto the bus of the bus system, the transceiver device being configured to transmit the entire frame onto the bus in an operating mode for transmitting and to receive the frame in a first communication phase.

13. A bus system, comprising:
a bus; and
at least two user stations that are connected to one another via the bus in such a way that they may communicate serially with one another, wherein at least one of the user stations includes:
  a communication control device configured to:
    control a communication of the user station with at least one other user station of the bus system, and generate a transmission signal for transmission onto a bus of the bus system and/or receive a signal from the bus, the communication control device being configured to generate the transmission signal according to a frame, and generate the transmission signal in such a way that in the transmission signal, a bit time of at least one bit is adapted as a function of an edge height of an edge that is to be provided between the at least one bit and a preceding bit in a signal in which the bit is to be transferred via the bus, wherein the bit time is a time duration, and the edge height of an edge is a difference between voltage levels of directly successive bits between which the edge is situated, and wherein the communication control device is configured to insert at least one predetermined bit into the transmission signal which indicates to a reception node in the bus system that a signal presently received from the bus is modified, at least in sections, in such a way that the at least one bit is adapted as a function of the edge height; and
  a voltage association module configured to associate a first voltage value or a second voltage value with a logical value of a bit of the transmission signal for the signal to be transferred via the bus, the voltage association module being configured to associate the logical value, with which the at least one bit in the signal on the bus has a minimum edge height at its start, with the at least one bit for the signal on the bus, wherein the first voltage value and the second voltage values are different voltage levels.

14. A method for communicating in a serial bus system, the method being carried out using a user station of the bus system including a communication control device, the method comprising the following steps:
  controlling, via the communication control device, a communication of the user station with at least one other user station of the bus system; and
  generating a transmission signal for transmission onto a bus of the bus system and/or receiving a signal from the bus, the communication control device generating the transmission signal according to a frame, and
  the communication control device generating the transmission signal in such a way that in the transmission signal, a bit time of at least one bit is adapted as a function of an edge height of an edge that is to be provided between the at least one bit and a preceding bit in a signal in which the bit is transferred via the bus, wherein the bit time is a time duration, and the edge height of an edge is a difference between voltage levels of directly successive bits between which the edge is situated, and the communication control device inserting at least one predetermined bit into the transmission signal which indicates to a reception node in the bus system that a signal presently received from the bus is modified, at least in sections, in such a way that the at least one bit is adapted as a function of the edge height.

* * * * *